(12) United States Patent
Kotake et al.

(10) Patent No.: US 9,935,784 B2
(45) Date of Patent: Apr. 3, 2018

(54) NETWORKED AIR-CONDITIONING SYSTEM, REPEATER AND PROGRAM

(71) Applicants: Hiroaki Kotake, Tokyo (JP); Yoshiaki Koizumi, Tokyo (JP); Takuya Mukai, Tokyo (JP)

(72) Inventors: Hiroaki Kotake, Tokyo (JP); Yoshiaki Koizumi, Tokyo (JP); Takuya Mukai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 323 days.

(21) Appl. No.: 14/764,253

(22) PCT Filed: Feb. 21, 2013

(86) PCT No.: PCT/JP2013/054381
§ 371 (c)(1),
(2) Date: Jul. 29, 2015

(87) PCT Pub. No.: WO2014/128891
PCT Pub. Date: Aug. 28, 2014

(65) Prior Publication Data
US 2015/0372831 A1 Dec. 24, 2015

(51) Int. Cl.
*H04L 12/28* (2006.01)
*G08C 17/00* (2006.01)
(Continued)

(52) U.S. Cl.
CPC ........ *H04L 12/2807* (2013.01); *G05B 19/042* (2013.01); *G08C 17/00* (2013.01);
(Continued)

(58) Field of Classification Search
CPC ........... H04L 12/2803; H04L 2012/285; H04L 2012/2849; H04L 12/2809; H04L 12/2821
See application file for complete search history.

(56) References Cited

U.S. PATENT DOCUMENTS

| | | | | |
|---|---|---|---|---|
| 5,724,510 A | * | 3/1998 | Arndt | ............... H04L 29/12018 370/252 |
| 2004/0204793 A1 | * | 10/2004 | Yoon | ..................... F24F 11/006 700/277 |

(Continued)

FOREIGN PATENT DOCUMENTS

| | | |
|---|---|---|
| JP | 2004-301430 A | 10/2004 |
| JP | 2005-033239 A | 2/2005 |

(Continued)

OTHER PUBLICATIONS

International Search Report of the International Searching Authority dated Apr. 2, 2013 for the corresponding international application No. PCT/JP2013/054381 (and English translation).

*Primary Examiner* — Chirag R Patel
(74) *Attorney, Agent, or Firm* — Posz Law Group, PLC

(57) ABSTRACT

The lower-level information acquirer searches a lower-level network, and acquires lower-level addresses for air-conditioning devices that are connected to the lower-level network. A database generator searches an upper-level network, and generates a database of upper-level addresses of air-conditioning devices that are connected to the upper-level network. An address assigner references the database generated by the database generator, and assigns vacant addresses existing among the upper-level addresses of the upper-level network to air-conditioning devices that are connected to the lower-level network. The table generator generates an address conversion table for converting the upper-level addresses assigned by the address assigner to lower-level addresses acquired by the lower-level information acquirer.

13 Claims, 16 Drawing Sheets

(51) Int. Cl.
*H04L 29/12* (2006.01)
*G05B 19/042* (2006.01)
*F24F 11/00* (2018.01)

(52) U.S. Cl.
CPC ........ *H04L 12/283* (2013.01); *H04L 12/2809* (2013.01); *H04L 61/103* (2013.01); *H04L 61/1505* (2013.01); *H04L 61/2038* (2013.01); *F24F 2011/0067* (2013.01); *G05B 2219/2614* (2013.01); *H04L 2012/285* (2013.01)

(56) References Cited

U.S. PATENT DOCUMENTS

| | | | |
|---|---|---|---|
| 2006/0059168 A1* | 3/2006 | Hamada | H04L 12/2803 |
| 2006/0253544 A1* | 11/2006 | Luoma | H04H 60/25 |
| | | | 709/217 |
| 2006/0274363 A1* | 12/2006 | Katano | H04L 29/12028 |
| | | | 358/1.15 |
| 2009/0013210 A1* | 1/2009 | McIntosh | H04L 41/0672 |
| | | | 714/4.1 |
| 2010/0319362 A1* | 12/2010 | Hisaoka | F24F 11/0086 |
| | | | 62/56 |
| 2013/0166737 A1* | 6/2013 | Christenson | H04L 69/40 |
| | | | 709/224 |

FOREIGN PATENT DOCUMENTS

| | | |
|---|---|---|
| JP | 4043164 B2 | 11/2007 |
| JP | 2009-014281 A | 1/2009 |

\* cited by examiner

FIG.6

<BEFORE SETTING THE ADDRESS: AD00>

| CONNECTED DEVCIE | TYPE | FIRST AIR-CONDITIONING SYSTEM ADDRESS |
|---|---|---|
| CENTRAL CONTROL DEVICE 1 | CENTRAL CONTROLL DEVICE | 00h |
| OUTDOOR DEVICE 110 | OUTDOOR DEVICE | 01h |
| - | - | 02h |
| - | - | 03h |
| INDOOR DEVICE 120 | INDOOR DEVICE | 04h |
| - | - | 05h |
| - | - | 06h |
| - | - | 07h |
| - | - | 08h |

<AFTER SETTING THE ADDRESS: AD01>

| CONNECTED DEVICE | TYPE | FIRST AIR-CONDITIONING SYSTEM ADDRESS |
|---|---|---|
| CENTRAL CONTROL DEVICE 1 | CENTRAL CONTROLL DEVICE | 00h |
| OUTDOOR DEVICE 110 | OUTDOOR DEVICE | 01h |
| - | - | 02h |
| - | - | 03h |
| INDOOR DEVICE 120 | INDOOR DEVICE | 04h |
| INDOOR DEVICE 200 | INDOOR DEVICE | 05h |
| INDOOR DEVICE 210 | INDOOR DEVICE | 06h |
| INDOOR DEVICE 220 | INDOOR DEVICE | 07h |
| INDOOR DEVICE 230 | INDOOR DEVICE | 08h |

(-) UNUSED

FIG.7

<AFTER SETTING THE ADDRESS: AT00>

| CONNECTED DEVICE | TYPE | COMMUNICATION METHOD | UPPER-LEVEL ADDRESS | | LOWER-LEVEL ADDRESS | |
|---|---|---|---|---|---|---|
| | | | SYSTEM | ADDRESS | SYSTEM | ADDRESS |
| INDOOR DEVICE 200 | INDOOR DEVICE | SECOND COMMUNICATION METHOD | 1A | 05h | 2A | 01h |
| OUTDOOR DEVICE 210 | OUTDOOR DEVICE | SECOND COMMUNICATION METHOD | 1A | 06h | 2B | 01h |
| INDOOR DEVICE 220 | INDOOR DEVICE | SECOND COMMUNICATION METHOD | 1A | 07h | 2B | 02h |
| INDOOR DEVICE 230 | INDOOR DEVICE | THIRD COMMUNICATION METHOD | 1A | 08h | 3A | 01h |

FIG.10

<BEFORE SETTING THE ADDRESS: AD02>

| CONNECTED DEVICE | TYPE | FIRST AIR-CONDITIONING SYSTEM ADDRESS |
|---|---|---|
| CENTRAL CONTROL DEVICE 1 | CENTRAL CONTROL DEVICE | 00h |
| OUTDOOR DEVICE 110 | OUTDOOR DEVICE | 01h |
| – | – | 02h |
| – | – | 03h |
| INDOOR DEVICE 120 | INDOOR DEVICE | 04h |
| – | – | 05h |
| – | – | 06h |
| – | – | 07h |
| – | – | 08h |

<AFTER SETTING THE ADDRESS: AD03>

| CONNECTED DEVICE | TYPE | FIRST AIR-CONDITIONING SYSTEM ADDRESS |
|---|---|---|
| CENTRAL CONTROL DEVICE 1 | CENTRAL CONTROL DEVICE | 00h |
| OUTDOOR DEVICE 110 | OUTDOOR DEVICE | 01h |
| – | – | 02h |
| – | – | 03h |
| INDOOR DEVICE 120 | INDOOR DEVICE | 04h |
| INDOOR DEVICE 200 | INDOOR DEVICE | 05h |
| INDOOR DEVICE 210 | INDOOR DEVICE | 06h |
| INDOOR DEVICE 220 | INDOOR DEVICE | 07h |
| INDOOR DEVICE 230 | INDOOR DEVICE | 08h |

(–) UNUSED

FIG.11

⟨AFTER SETTING THE ADDRESS: AT01⟩

| CONNECTED DEVICE | TYPE | COMMUNICATION METHOD | UPPER-LEVEL ADDRESS | | LOWER-LEVEL ADDRESS | |
|---|---|---|---|---|---|---|
| | | | SYSTEM | ADDRESS | SYSTEM | ADDRESS |
| INDOOR DEVICE 200 | INDOOR DEVICE | SECOND COMMUNICATION METHOD | 1A | 02h | 2A | 01h |
| OUTDOOR DEVICE 210 | OUTDOOR DEVICE | SECOND COMMUNICATION METHOD | 1A | 03h | 2B | 01h |
| INDOOR DEVICE 220 | INDOOR DEVICE | SECOND COMMUNICATION METHOD | 1A | 04h | 2B | 02h |
| INDOOR DEVICE 230 | INDOOR DEVICE | THIRD COMMUNICATION METHOD | 1A | 05h | 3A | 01h |

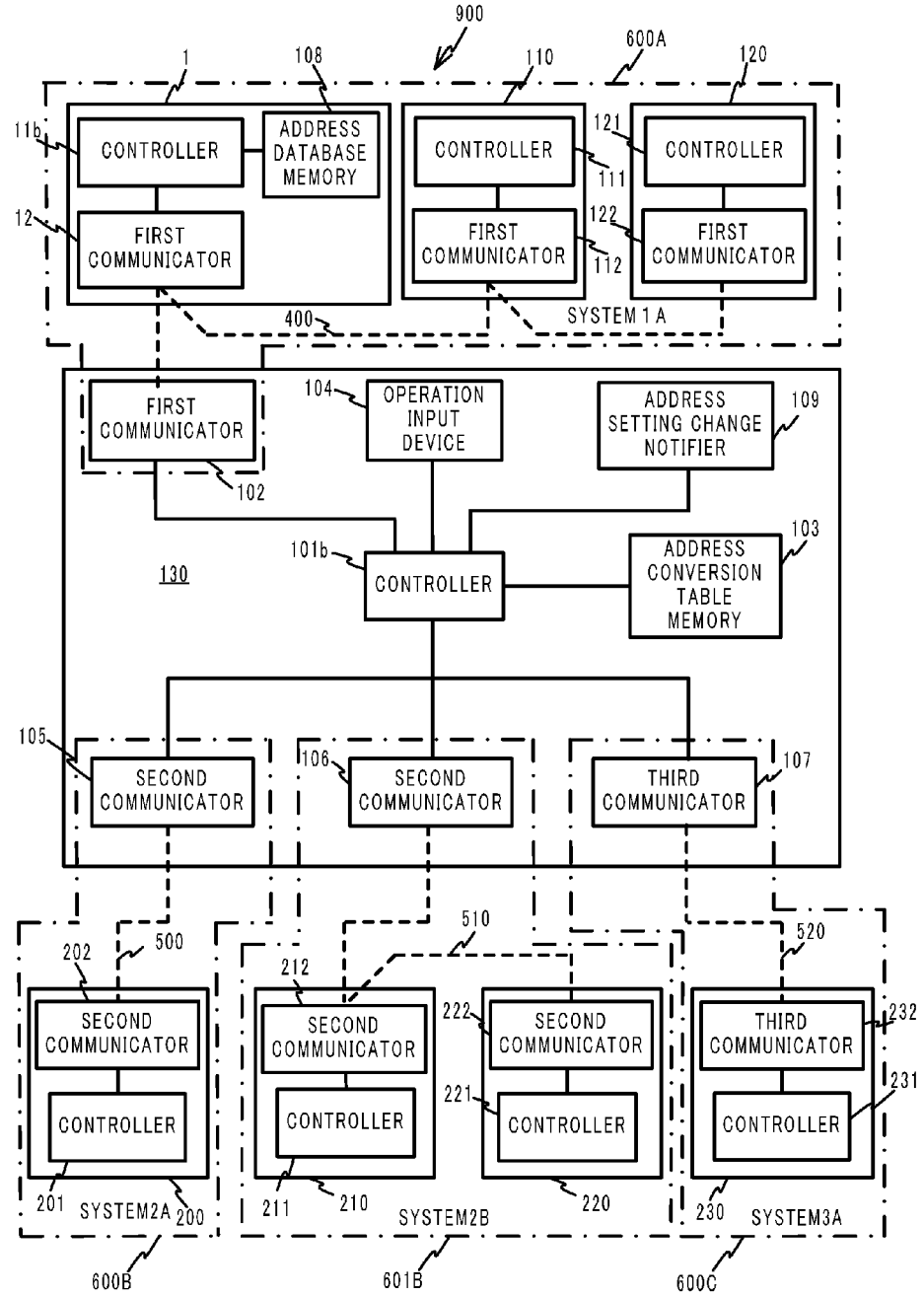

NETWORKED AIR-CONDITIONING SYSTEM, REPEATER AND PROGRAM

CROSS REFERENCE TO RELATED APPLICATION

This application is a U.S. national stage application of PCT/JP2013/054381 filed on Feb. 21, 2013, the contents of which are incorporated herein by reference.

TECHNICAL FIELD

The present disclosure relates to a networked air-conditioning system, repeater and program.

BACKGROUND ART

Air-conditioning systems are known with a central control device, and air-conditioning devices such as outdoor devices, indoor devices and the like are connected in parallel, and the central control device controls the air-conditioning devices (for example, see Japanese Patent Literature 1).

An air-conditioning system can form a networked air-conditioning system by expanding the air-conditioning system by connecting an air-conditioning system (upper-level air-conditioning system) that is connected to an upper-level bus, and air-conditioning system (lower-level air-conditioning system) that is connected to a lower-level bus. In a networked air-conditioning system that the communication methods for the upper-level air-conditioning system and the lower-level air-conditioning system are different in, the case of performing individual control of an air-conditioning device in a lower-level air-conditioning system from the upper-level air-conditioning system will be considered. In this case, it is necessary to provide a new function in the air-conditioning devices of the lower-level air-conditioning system for performing communication with the upper-level air-conditioning system. Furthermore, the upper-level air-conditioning must be able to specify an air-conditioning device of a lower-level air-conditioning system that is to be the target of control.

Therefore, a system is disclosed that connects an upper-level air-conditioning system and a lower-level air-conditioning system by providing a converter between the bus of an upper-level air-conditioning system and the bus of a lower-level air-conditioning system (for example, see Japanese Patent Literature 2).

The converter disclosed in Japanese Patent Literature 2 has a protocol conversion function. The converter receives a control command with the address of an air-conditioning device that is to be the target of control, interprets that control command through a protocol converter, and converts the communication method. With this converter, it becomes possible to perform communication between networks that have communication methods that are different from each other, and it becomes possible to perform individual control of an air-conditioning device in a lower-level air-conditioning system from an upper-level air-conditioning system.

CITATION LIST

Patent Literature

Patent Literature 1: Japanese Patent No. 4,043,164
Patent Literature 2: Unexamined Japanese Patent Application Kokai Publication No. 2004-301430

SUMMARY OF INVENTION

Technical Problem

In an existing upper-level air-conditioning system (upper-level network) and existing lower-level air-conditioning system (lower-level network), typically an individual address is assigned to each air-conditioning device. In the networked air-conditioning system disclosed in Japanese Patent Literature 2 above, in order for a controller to control an air-conditioning device that is connected to another field network, it is necessary for that controller to specify the address of the air-conditioning device that is connected to that other field network as a transmission destination. However, Japanese Patent Literature 2 does not particularly disclose a method for specifying the address of an air-conditioning device that is connected to another field network. Therefore, in reality, when performing individual control of an air-conditioning device of a lower-level network from an upper-level network, it becomes necessary to change the specifications of the system such as unifying the address system for the upper-level network and lower-level network.

This object of this disclosure is to solve the problem above by providing a networked air-conditioning system, repeater and program configured to make it possible to perform individual control of an air-conditioning device in an existing lower-level network from an existing upper-level network without having to change the specifications of the upper-level network and lower-level network.

Solution to Problem

In order to accomplish the object described above, the networked air-conditioning of this disclosure is a networked air-conditioning system wherein a control device that is connected to an upper-level network controls air-conditioning devices that are connected to a lower-level network through a repeater that relays communication between the upper-level network and lower-level network; comprising:

a lower-level information acquirer configured to search the lower-level network and acquire lower-level addresses of air-conditioning devices that are connected to the lower-level network;

a database generator configured to search the upper-level network and generate a database of upper-level addresses of air-conditioning devices that are connected to the upper-level network;

an address assigner configured to reference the database generated by the database generator and assign vacant addresses existing among the upper-level addresses of the upper-level network to air-conditioning devices that are connected to the lower-level network; and a table generator configured to generate an address conversion table for converting upper-level addresses assigned by the address assigner to lower-level addresses acquired by the lower-level information acquirer.

Advantageous Effects of Invention

With the technology of this disclosure, it is possible to assign upper-level addresses of an upper-level network to air-conditioning devices that are connected to a lower-level network, so it is possible to perform individual control of air-conditioning devices that are connected to an existing lower-level network from a control device that is connected

BRIEF DESCRIPTION OF DRAWINGS

FIG. 6 illustrates an example of the configuration of data in an address database of a networked air-conditioning system of a first embodiment of this disclosure;

FIG. 7 illustrates an example of the configuration of data in an address conversion table of a networked air-conditioning system of a first embodiment of this disclosure;

FIG. 10 illustrates an example of the configuration of data in an address database of a networked air-conditioning system of a second embodiment of this disclosure;

FIG. 11 illustrates an example of the configuration of data in an address conversion table of a networked air-conditioning system of a second embodiment of this disclosure;

FIG. 12 is a block diagram illustrating the construction of a networked air-conditioning system of a third embodiment of this disclosure;

DESCRIPTION OF EMBODIMENTS

In the following, embodiments of the disclosure will be explained in detail with reference to the drawings.

In the following embodiments, a repeater that connects an upper-level air-conditioning system of an upper network, and multiple lower-level air-conditioning systems of a lower-level network, and a networked air-conditioning system that individual control of an air-conditioning device of a low-level air-conditioning system is performed in from a central control device of an upper-level system by connecting through the repeater are explained. Here, an address in the upper-level network is taken to be an upper-level address, and an address in the lower-level network is taken to be a lower-level address.

First Embodiment

First, a first embodiment of this disclosure will be explained.

In this embodiment, the construction of a networked air-conditioning system 900 will be explained with reference to FIG. 1, however, this construction does not limit this disclosure.

(Construction of a Networked Air-Conditioning System)

Figure 1:
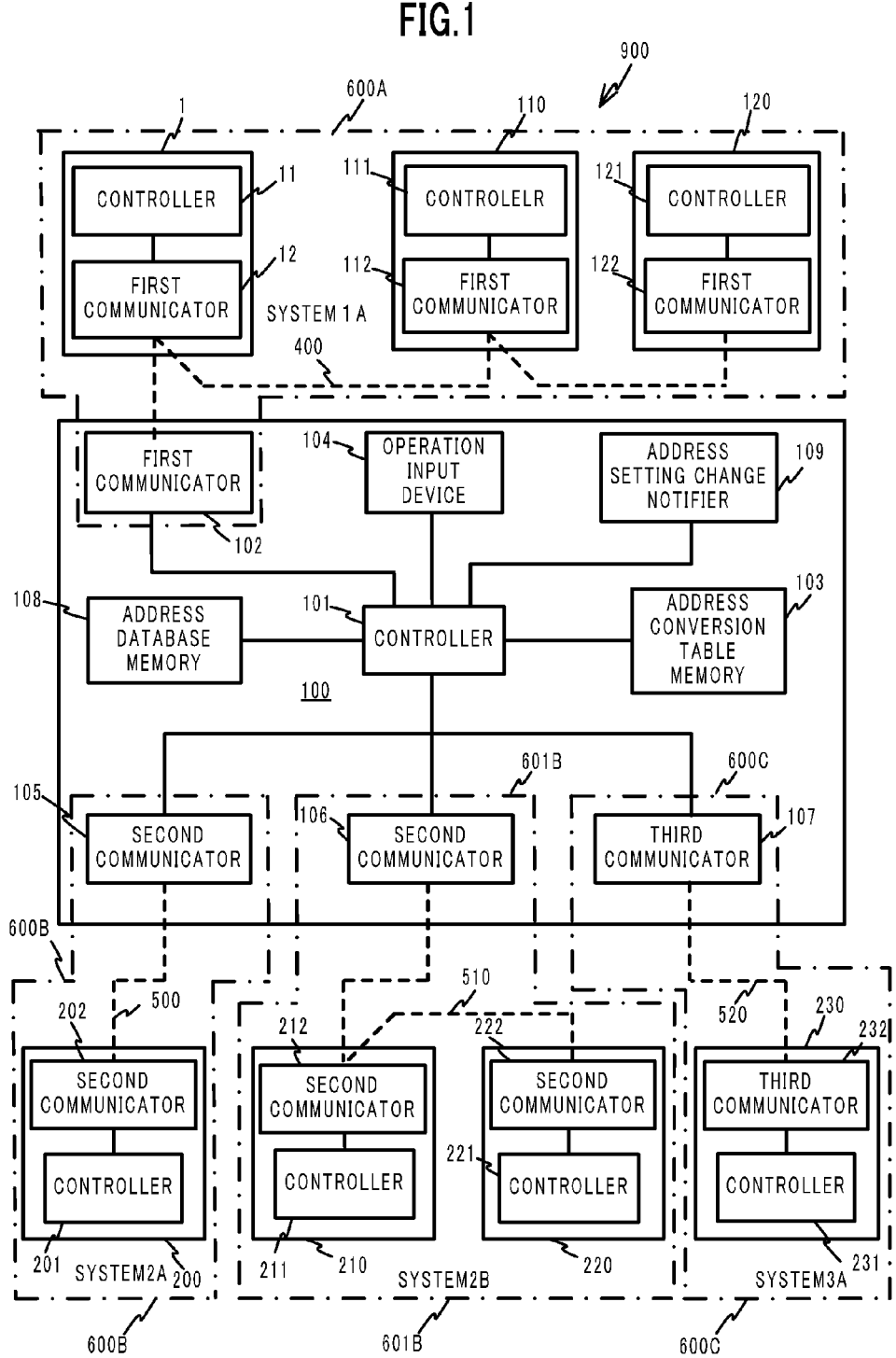
FIG. 1 is a block diagram illustrating the construction of a networked air-conditioning system of a first embodiment of this disclosure.

FIG. 1 illustrates the basic construction of the networked air-conditioning system 900 of this embodiment. This networked air-conditioning system 900 comprises a first air-conditioning system 600A, second air-conditioning systems 600B and 601B, and a third air-conditioning system 600C. In this embodiment, the first air-conditioning system 600A corresponds to an upper-level air-conditioning system, and the second air-conditioning systems 600B and 601B, and third air-conditioning system 600C correspond to lower-level air-conditioning systems. The networked air-conditioning system 900 is a system that a central control device that is connected to the upper-level network controls an air-conditioning device that is connected to a lower-level network through a repeater that relays communication between the upper-level network and lower-level network in.

The first air-conditioning system 600A comprises a central control device 1, an outdoor device 110, and an indoor device 120. In the first air-conditioning system 600A, communication is performed using a first communication method.

The second air-conditioning system 600B comprises an indoor device 200. The second air-conditioning system 601B comprises an outdoor device 210 and an indoor device 220. In the second air-conditioning systems 600B and 601B, communication is performed using a second communication method.

The third air-conditioning system 600C comprises an indoor device 230. In the third air-conditioning systems 600C, communication is performed using a third communication method.

The first air-conditioning system 600A, second air-conditioning systems 600B and 601B, and third air-conditioning system 600C are connected together using a repeater 100.

The central control device 1, repeater 100, outdoor device 110 and indoor device 120 are connected by a first bus 400. The indoor device 200 is connected to the repeater 100 through a second bus 500. The outdoor device 210 and indoor device 220 are connected to the repeater 100 through a second bus 510. The indoor device 230 is connected to the repeater 100 through a third bus 520.

(Construction: Central Control Device of the First Air-Conditioning System)

The central control device 1 comprises a controller 11 and a first communicator 12.

The controller 11 comprises a computing device such as a CPU (Central Processing Unit) or the like, a RAM (Random Access Memory) as a work area, a ROM (Read Only Memory) as a storage device and the like. The function of the controller 11 is achieved by the computing device executing a program that is stored in the ROM. The controller 11 creates a control command to an air-conditioning device and transmits that control command to the air-conditioning device through the first communicator 12. The controller 11 receives the control command from the air-conditioning device through the first communicator 12 and analyzes the control command. In this way, the controller 11 performs control of the air-conditioning device and monitors the operating state through the first communicator 12.

The first communicator 12 modulates the control command created by the controller 11 to the first communication method, and transmits the control command. Then the first communicator 12 receives a control command for the central control device 1 in communication method 1, demodulates the control command and outputs the control command to the controller 11.

The controller 11 and first communicator 12 can be achieved by using separate devices, or part or all can be achieved by using a common device.

(Construction: Outdoor Device of the First Air-Conditioning System)

The outdoor device 110 comprises a controller 111 and a first communicator 112.

The controller 111 comprises a computing device such as a CPU or the like, a RAM as a work area, and ROM (Read Only Memory) and the like. The function of the controller 111 is achieved by the computing device executing a program that is stored in the ROM. The controller 111 analyzes a control command received through the first communicator 112, and controls the outdoor device 110 according to that control command. The controller 111 monitors the operating state, creates a control command for the operating state, and returns that control command to the central control device 1 through the first communicator 112.

The first communicator 112 modulates the control command created by the controller 111 to the first communication method, and transmits the control command. The first communicator 112 receives the control command that is for the outdoor device 110 by the first communication method, demodulates the control command, and outputs the control command to the controller 111.

The controller 111 and the first communicator 112 can be achieved by using separate devices, or part or all can be achieved by using a common device.

(Construction: Indoor Device of the First Air-Conditioning System)

The indoor device 120 comprises a controller 121 and first communicator 122.

The controller 121 comprises a computing device such as a CPU or the like, a RAM as a work area, a ROM (Read Only Memory) as a storage device, and the like. The function of the controller 121 is achieved by the computing device executing a program that is stored in the ROM. The controller 121 analyzes a control command received through the first communicator 122, and controls the indoor device 120 according to the control command. The controller 121 monitors the operating state, generates a control command related to the operating state, and returns that control command to the central control device 1 through the first communicator 122.

The first communicator 122 modulates the control command created by the controller 121 to the first communication method, and transmits the control command. The first communicator 122 receives the control command for the indoor device 120 using the first communication method, demodulates the control command, and outputs that control command to the controller 121.

The controller 121 and the first communicator 122 can be achieved by using separate devices, or part or all can be achieved by using a common device.

A unique upper-level address is assigned to the central control device 1, the outdoor device 110 and the indoor device 120 that are connected in system 1A.

(Repeater)

The repeater 100 comprises a controller 101, a first communicator 102, an address conversion table memory 103, an operation input device 104, a second communicator 105, a second communicator 106, a third communicator 107, an address database memory 108 and an address setting change notifier 109.

The controller 101 comprises a computing device such as a CPU or the like, a RAM as a work area, a ROM (Read Only Memory) as a storage device and the like. The function of the controller 101 is achieved by the computing device executing a program that is stored in the ROM. The controller 101 performs various operations based on operation input information that is inputted from the operation input device 104, and based on communication information from communication with the upper-level air-conditioning system (first air-conditioning system 600A) and lower-level air-conditioning systems (second air-conditioning systems 600B, 601B, and third air-conditioning system 600C). This kind of operation includes setting addresses of air-conditioning devices of the lower-level air-conditioning systems (second air-conditioning systems 600B, 601B, and third air-conditioning system 600C), updating the address conversion table memory 103, and searching for or updating the address database memory 108. Furthermore, the controller 101 performs protocol conversion of control commands of the upper-level air-conditioning system (first air-conditioning system 600A) and lower-level air-conditioning systems (second air-conditioning system 600B, 601B, and third air-conditioning system 600C).

Figure 2:
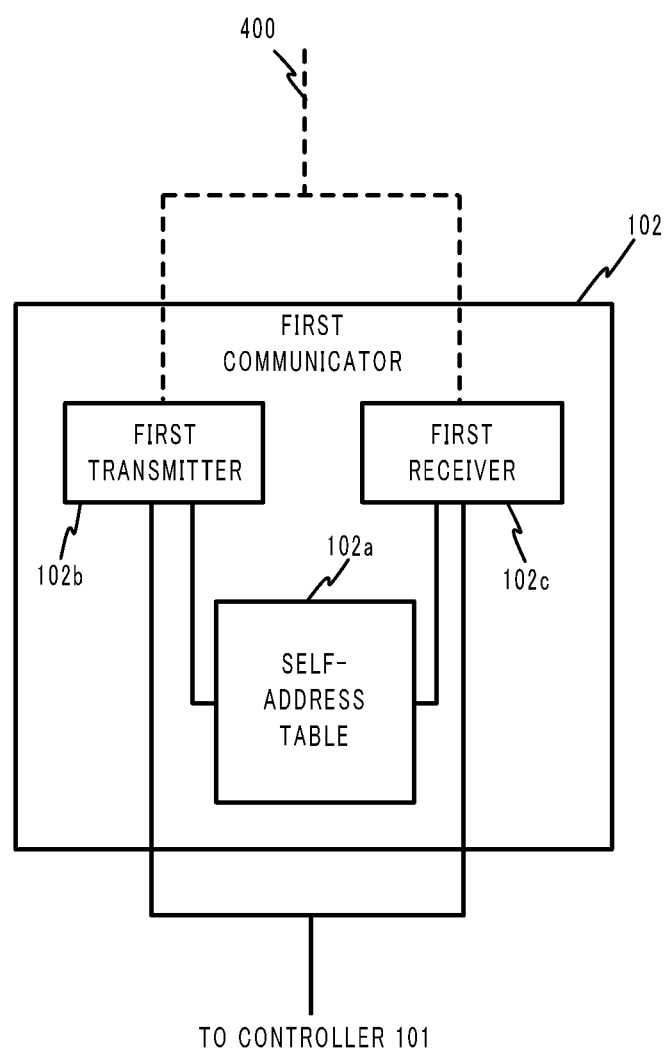
FIG. 2 is a block diagram illustrating the construction of a first communicator of a repeater of a networked air-conditioning system of a first embodiment of this disclosure.

The construction of the first communicator 102 is illustrated in FIG. 2. The first communicator 102 comprises a self-address table 102a, a first transmitter 102b and a first receiver 102c.

The self-address table 102a is created inside a storage device such as a ROM (Read Only Memory), flash memory or the like. The self-address table 102a stores one or more upper-level address as a self address. The repeater 100 performs communication in the first air-conditioning system 600A using this set upper-level address.

The first transmitter 102b modulates a control command that is created by the controller 101 to the first communication method, and transmits that control command.

The first receiver 102c receives a control command using the first communication method for the address stored in self-address table 102a, demodulates the control command and outputs that control command to the controller 101.

In this way, the first communicator 102, as a single device, is able to perform communication in the first air-conditioning system 600A by properly using multiple self addresses. It is possible to achieve the self-address table 102a, first transmitter 102b and first receiver 102c using separate devices, or part or all can be achieved using a common device.

The address conversion table memory 103 is created by a storage device such as a ROM (Read Only Memory), flash memory or the like. The address conversion table memory 103 stores an address conversion table that is able to convert the upper-level address that is assigned to an air-conditioning device of a lower-level air-conditioning system, and a lower-level address of an air-conditioning device of a lower-level air-conditioning system. Moreover, the address conversion table memory 103 stores the type of air-conditioning device (for example, central control device 1, outdoor device 110, indoor device 120 and the like), the communication method, and system.

The operation input device 104 receives operation input from an operator (user). The operation input device 104 is, for example, a rotary switch and the like. The operation input device 104, for example, sets the address that will be a reference for the upper-level address that is assigned to an air-conditioning device of a lower-level air-conditioning system.

The second communicators 105, 106 modulate control commands that have undergone protocol conversion by the controller 101 to the second communication method, and transmit the control commands. Moreover, the second communicators 105, 106 receive control commands having air-conditioning devices of the second air-conditioning systems 600B, 601B that are connected in the second communication method as transmission sources, demodulate the control commands and output the control commands to the controller 101. Unique lower-level addresses are assigned in the connected systems 2A, 2B to the second communicators 105, 106.

The construction of the second communicators 105, 106 is the same as the construction of the first communicator 102 illustrated in FIG. 2.

The third communicator 107 modulates a control command that has undergone protocol conversion by the controller 101 in the third communication method, and transmits that control command. The third communicator 107 receives a control command having an air-conditioning device of the thirst air-conditioning system 600C that is connected by the third communication method as the transmission source, demodulates the control command and outputs that control command to the controller 101. Moreover, a unique lower-level address is assigned to the third communicator 107 in the connected system 3A.

The address database memory 108 is created by a storage device such as a ROM, flash memory and the like. The address database memory 108 stores upper-level addresses and types of air-conditioning devices that are connected to the upper-level network.

The address setting change notifier 109 is a display device. This kind of display device can be an LED or liquid-crystal display or the like, for example. The address setting change notifier 109 notifies an operator when the upper-level address assigned to an air-conditioning device of a lower-level air-conditioning system is changed from an upper-level address having all consecutive numbers that the setting value of the operation input device 104 (upper-level address specified by the user) is taken to be the starting address in. At this time, the user is notified of the upper-level addresses, the system and the like, before and after the change of an air-conditioning device that the upper-level address assignment was changed of.

The controller 101, the first communicator 102, the address conversion table memory 103, the operation input device 104, the second communicator 105, the second communicator 106, the third communicator 107 and the address database memory 108 can be achieved using separate devices, or part or all of the devices can be common.

In this embodiment, the repeater 100 comprises the first communicator 102, the second communicator 105, the second communicator 106 and the third communicator 107. There should be at least one each of the second communicator 106 and third communicator 107.

Moreover, in this embodiment, the repeater 100 is constructed so as to be independent from the outdoor device and indoor device, however, the repeater 100 can be included inside an air-conditioning device.

(Construction: Indoor Device of the Second Air-Conditioning System)

The indoor device 200 comprises a controller 201 and a second communicator 202.

The controller 201 comprises a computing device such as a CPU or the like, a RAM as a work area, and a ROM (Read Only Memory) as a storage device. The function of the controller 201 is achieved by the computing device executing a program that is stored in the ROM. The controller 201 analyzes a control command received through the second communicator 202, and controls the indoor device 200 according to the control command. The controller 201 monitors the operating state, creates a control command for the operating state, and returns that control command to the central control device 1 through the second communicator 202.

The second communicator 202 modulates the control command created by the controller 201 in the second communication method and transmits the control command. The second communicator 202 receives the control command for the indoor device 200 by the second communication method, demodulates that control command and outputs the control command to the controller 201.

The controller 201 and the second communicator 202 can be achieved by using separate devices, or part or all of devices can be made common.

(Construction: Outdoor Device of the Second Air-Conditioning System)

The outdoor device 210 comprises a controller 211 and a second communicator 212.

The controller 211 comprises a computing device such as a CPU or the like, a RAM as a work area and a ROM (Read Only Memory) as a storage device. The function of the controller 211 is achieved by the computing device executing a program that is stored in the ROM. The controller 211 analyzes a control command received through the second communicator 212, and controls the outdoor device 210 according to that control command. The controller 211 monitors the operating state, creates a control command for the operating state, and returns that control command to the central control device 1 through the second communicator 212.

The second communicator 212 modulates the control command created by the controller 211 to the second communication method, and transmits the control command. Moreover, the second communicator 212 receives a control command for the outdoor device 210 using the second communication method, demodulates that control command, and outputs the control command to the controller 211.

The controller 211 and the second communicator 212 can be achieved by using separate devices, or part or all of the devices can be made to be common.

(Construction: Indoor Device of the Second Air-Conditioning System)

The indoor device 220 comprises a controller 221 and a second communicator 222.

The controller 221 comprises a computing device such as a CPU or the like, a RAM as a work area, and a ROM (Read Only Memory) as a storage device. The function of the controller 221 is achieved by the computing device executing a program that is stored in the ROM. The controller 221 analyzes a control command received through the second communicator 222, and controls the indoor device 220 according to that control command. The controller 221 monitors the operating state, creates a control command for the operating state, and returns that control command to the central control device 1 through the second communicator 222.

The second communicator 222 modulates the control command created by the controller 221 to the second communication method, and transmits the control command. Moreover, the second communicator 222 receives a control command for the outdoor device 220 using the second communication method, demodulates that control command and outputs the control command to the controller 221.

The controller 221 and the second communicator 222 can be achieved using separate devices, or part or all of the devices can be made to be common.

(Construction: Indoor Device of the Third Air-Conditioning System)

The indoor device 230 comprises a controller 231 and a third communicator 232.

The controller 231 comprises a computing device such as a CPU or the like, a RAM as a work area, and a ROM (Read Only Memory) as a storage device. The function of the controller 231 is achieved by the computing device executing a program that is stored in the ROM. The controller 231 analyzes a control command received through the third communicator 232, and controls the indoor device 230 according to that control command. The controller 231 monitors the operating state, creates a control command for the operating state, and returns that control command to the central control device 1 through the third communicator 232.

The third communicator 232 modulates the control command created by the controller 231 to the third communication method, and transmits the control command. The third communicator 232 receives a control command for the indoor device 230 using the third communication method, demodulates that control command and outputs the control command to the controller 231.

The controller 231 and the third communicator 232 can be achieved using separate devices, or part or all of the devices can be made to be common.

(Construction: Busses)

First bus 400 is the communication line for the first air-conditioning system 600A. Communication using the first communication method is performed on the first bus 400. In this embodiment, a wired bus is preferred, however, the bus can also be wireless. Moreover, the power line that supplies electric power to the central control device 1, and the power line that supplies power to the repeater 100, the outdoor device 110, and the indoor device 120 are preferably provided separately, however, the power lines can be common.

Second busses 500, 510 are communication lines for the second air-conditioning systems 600B, 601B. Communication using the second communication method is performed on the second busses 500, 510. In this embodiment, wired busses are preferred, however, the busses can also be wireless. Moreover, preferably the power lines that supply electric power to the repeater 100, the indoor device 200, the outdoor device 210 and the indoor device 220 are provided separately, but the power lines can be common.

Third bus 520 is a communication line for the third air-conditioning system 600C. Communication using the third communication method is performed on the third bus 520. In this embodiment, a wired bus is preferred, however, the bus can also be wireless. Moreover, preferably the power lines that supply electric power to the repeater 100 and the indoor device 230 are provided separately, but the power lines can be common.

Figure 3:
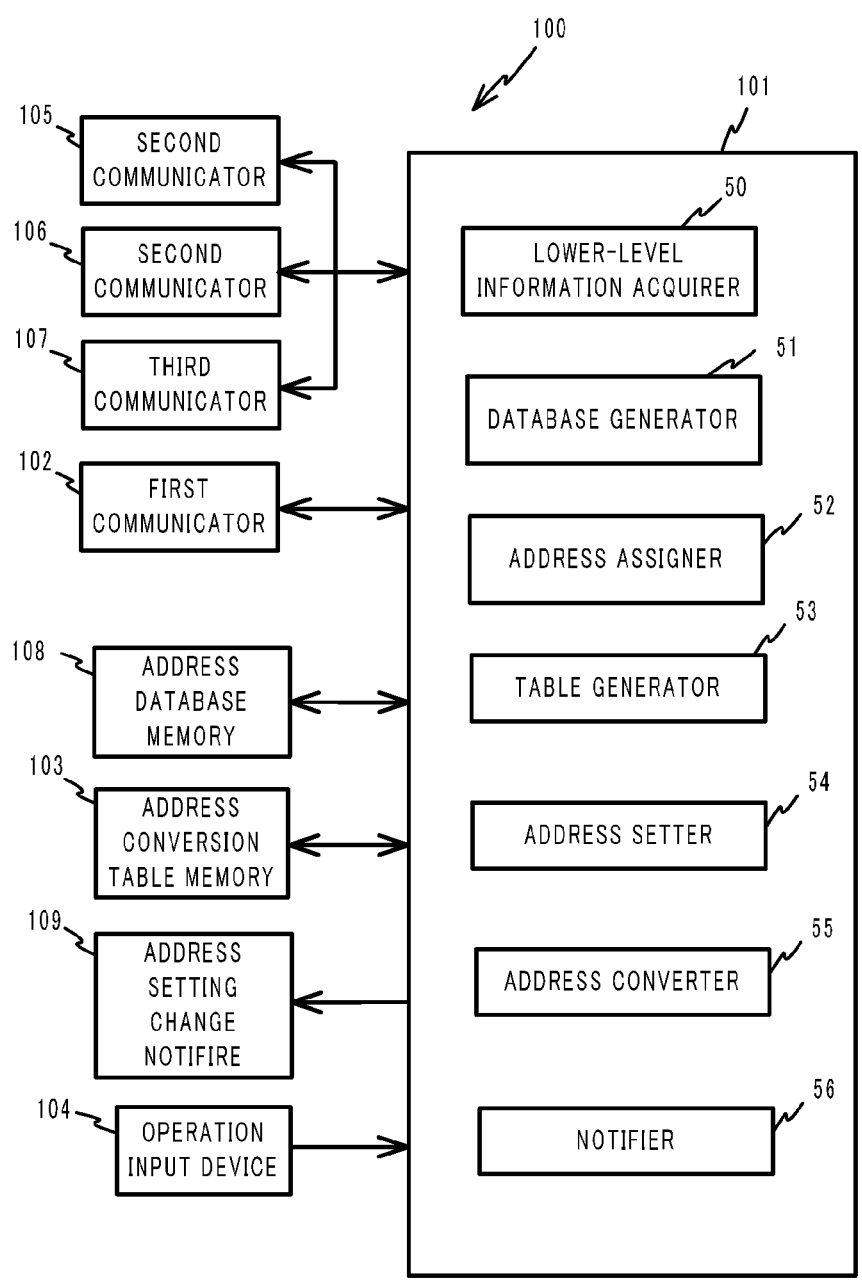
FIG. 3 is a block diagram illustrating the construction of a controller of a repeater of a networked air-conditioning system of a first embodiment of this disclosure.

FIG. 3 illustrates the functional construction of the repeater 100. As illustrated in FIG. 3, the repeater 100 comprises a lower-level information acquirer 50, a database generator 51, an address assigner 52, a table generator 53, an address setter 54, and address converter 55 and a notifier 56.

The lower-level information acquirer 50 searches a lower-level network, and acquires the lower-level addresses of air-conditioning devices that are connected to the lower-level network. In this embodiment, lower-level air-conditioning systems are searched for, and the lower-level addresses of the indoor device 200, outdoor device 210, indoor device 220 and indoor device 230 are acquired.

The database generator 51 searches an upper-level network, and creates a database of upper-level addresses of air-conditioning devices that are connected to the upper-level network. In this embodiment, an upper-level air-conditioning system is searched for, and a database of the upper-level addresses of the outdoor device 110 and indoor device 120 is created.

The address assigner 52 assigns vacant addresses of the upper-level addresses of the upper-level network to the air-conditioning devices that are connected to the lower-level network. The assignment results are stored in the address database memory 108. In this embodiment, vacant addresses of the upper-level network are assigned to the indoor device 200, the outdoor device 210, the indoor device 220 and the indoor device 230.

The table generator 53 generates an address conversion table that converts the upper-level addresses assigned by the address assigner 52 to the lower-level addresses that acquired by the lower-level information acquirer 50. The generated address conversion table is stored in the address conversion table memory 103. In this embodiment, an address conversion table that converts upper-level address to lower-level addresses is created for the indoor device 200, the outdoor device 210, the indoor device 220 and the indoor device 230.

The address setter 54 selects the upper-level addresses that are assigned to the air-conditioning devices of the lower-level air-conditioning systems as self addresses, and updates the self-address table 102a of the first communicator 102.

The address converter 55 converts the address of a transmission destination of a received control packet by referencing the address conversion table that is stored in the address conversion table memory 103.

The notifier 56 transmits notification data to the address setting change notifier 109.

(Operation)

Next, the address setting operation for assigning upper-level addresses to the air-conditioning devices of the lower-level air-conditioning systems will be explained with reference to FIG. 4, FIG. 5, FIG. 6 and FIG. 7, and with the setting value 02 h of the operation input device 104 as an example. In this embodiment, the upper-level addresses (vacant addresses) that are assigned to the air-conditioning devices of the lower-level air-conditioning systems are assigned so as to be consecutive numbers.

Figure 4:
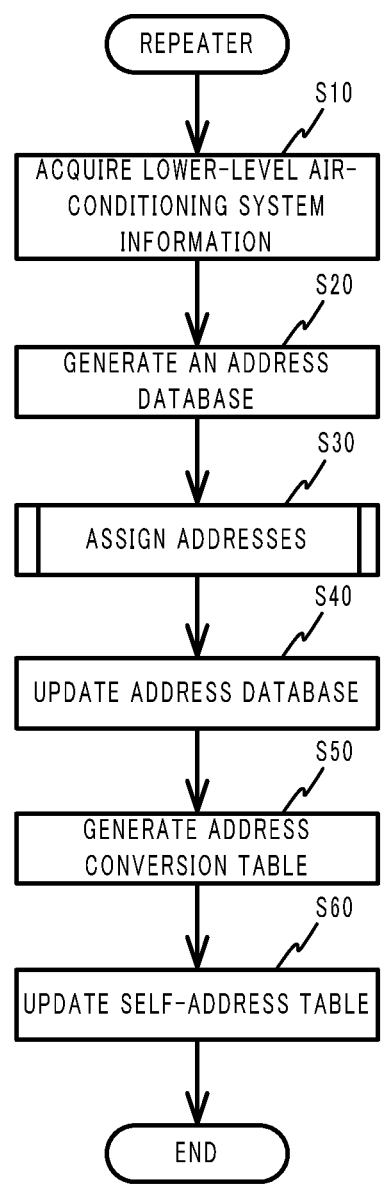
FIG. 4 is a flowchart of processing by a repeater of a networked air-conditioning system of a first embodiment of this disclosure when setting addresses.

FIG. 4 illustrates the processing by the repeater 100 when performing the setting above.

First, the repeater 100 (lower-level information acquirer 50) acquires information about the air-conditioning devices that are connected to the lower-level air-conditioning systems (step S10). More specifically, the repeater 100 (lower-level information acquirer 50) checks whether or not the second communicator 105, the second communicator 106 and the third communicator 107 are connected, performs communication with the air-conditioning devices of the lower-level air-conditioning systems, and acquires the types, communication methods, and system information of air-conditioning devices of the lower-level air-conditioning systems.

Next, the repeater 100 (database generator 51) updates the self-address table 102a with the setting value of the operation input device 104 as the self address, then with this address as the transmission source, searches for an upper-level address, and generates an address database (step S20). The upper-level address search is a control command that inquires of the air-conditioning devices of the upper-level air-conditioning system for the device types. The air-conditioning devices of the upper-level air-conditioning system that received the address search transmitted by the repeater 100 return a response that includes the type information of the device to the repeater 100. The repeater 100 (database generator 51) performs an address search of the upper-level air-conditioning system for all of the addresses that can be set. FIG. 6 illustrates an example of the address database at this time (before setting the addresses: AD00).

The repeater 100 (address assigner 52) executes an address assigning process for setting upper-level address to be assigned to the air-conditioning devices of lower-level air-conditioning systems based on the generated address database (before setting the addresses: AD00) (step S30). Step S30 will be described later.

Next, the repeater 100 (address assigner 52) performs an update of the address database based on addresses set in step S30 (step S40). FIG. 6 illustrates the updated address database (after setting the addresses: AD01).

The repeater 100 (table generator 53) generates an address conversion table based on the information acquired in step S10 and on the address database updated in step S40 (after setting the addresses: AD01) (step S50). FIG. 7 illustrates a generated address conversion table (after setting the addresses: AT00).

Then, the repeater 100 (address setter 54) selects the upper-level addresses that are assigned to the air-conditioning devices of lower-level air-conditioning systems from among the address database (after setting the addresses: AD01) updated in step S40 as self addresses, and updates the self-address table 102a of the first communicator 102 (step S60).

Figure 5:
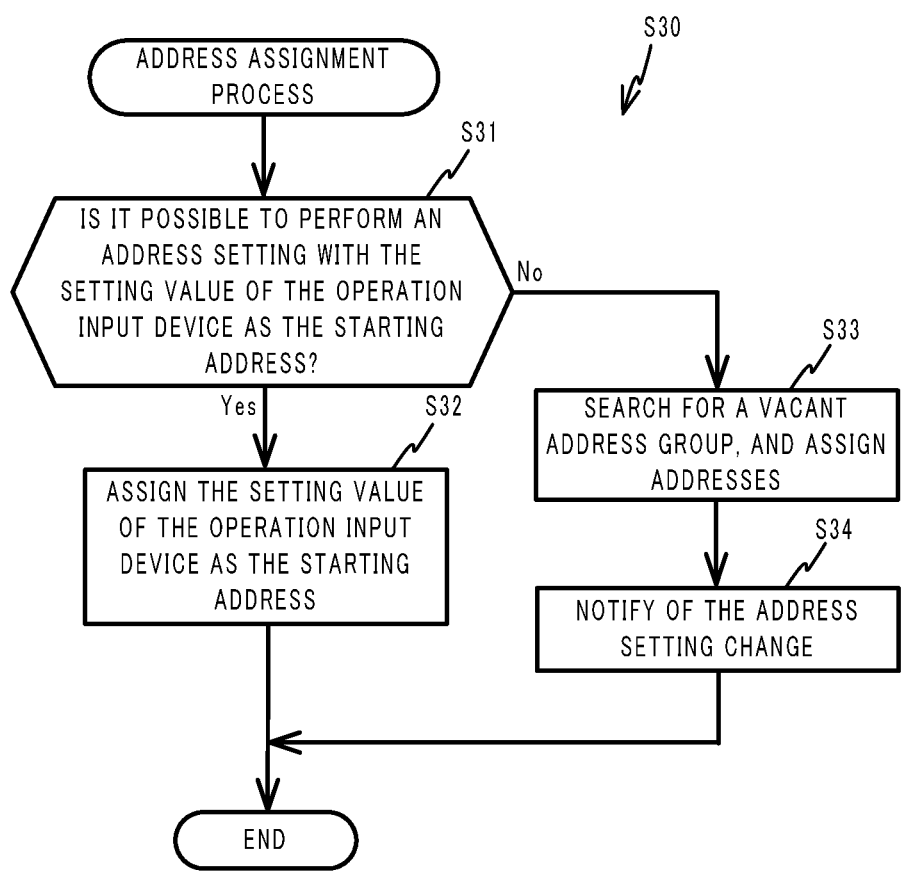
FIG. 5 is a flowchart of address assignment processing by a repeater of a networked air-conditioning system of a first embodiment of this disclosure when setting addresses.

Here, the address setting process of step S30 will be explained with reference to FIG. 5.

First, the repeater 100 (address assigner 52) searches for the address database (before setting the addresses: AD00) and determines whether or not it is possible to assign upper-level addresses for the air-conditioning devices of lower-level air-conditioning systems so as to be consecutive numbers with the setting value of the operating input device 104 as the starting address (step S31). As illustrated in FIG. 6, address 04 h is used for the indoor device 120, so when performing the assignment above, overlapping of upper-level addresses occurs (before setting the addresses: AD00). In this case, the repeater 100 (address assigner 52) determines that assignment is not possible (step S31: No).

When the consecutive addresses based on the setting value of the operation input device 104 overlap with the addresses of the air-conditioning devices that are connected to the upper-level network (step S31: No), the repeater 100 (address assigner 52) searches the address database (AD00), searches for other consecutive vacant addresses for the number of the air-conditioning devices of the lower-level air-conditioning systems that are unused, in other words, a vacant address group, and assigns a vacant address group as vacant addresses for the air-conditioning devices that are connected to a lower-level network (step S33). Here, the repeater 100 sets a vacant address group having consecutive numbers and found from the search as the upper-level addresses to be assigned to the air-conditioning devices of the lower-level air-conditioning systems.

Here, addresses are searched from the minimum value, however, it is also possible to perform the search from the maximum value or from an arbitrary value. In this way, where overlapping of addresses occurs, the address assigner 52 changes the upper-level addresses to be assigned to the air-conditioning devices of the lower-level air-conditioning systems. As a result, it is possible to assign upper-level addresses to air-conditioning devices of lower-level air-conditioning systems without changing the existing addresses of air-conditioning devices of the upper-level air-conditioning system.

Moreover, here, the address assigner 52 assigns consecutive vacant addresses to air-conditioning device of lower-level air-conditioning systems. However, as long as the addresses that are assigned to air-conditioning devices of the same system are consecutive, the addresses that are assigned to air-conditioning devices of a different system do not necessarily need to be consecutive with them.

Next, the repeater 100 (notifier 56) notifies that the upper-level addresses assigned to the air-conditioning devices of lower-level air-conditioning systems are not consecutive address based on the address specified by the operator, or in other words, notifies that there was an address setting change that the addresses have been changed from the setting value set by the operation input device 104 as the starting address in (step S34). At this time, the operator is notified through the address setting change notifier 109 of the upper-level addresses, system and the like before and after the change of the air-conditioning devices that the assigned upper-level addressed were changed for. As a result, the operator is able to know the upper-level addresses that are assigned to the air-conditioning devices of the lower-level air-conditioning systems.

Moreover, when it is determined that it is possible to assign setting values to the air-conditioning devices of the lower-level air-conditioning systems so as to be consecutive addresses with all the setting values set by the operation input device 104 as the starting address (step S31: Yes), the repeater 100 (address assigner 52) assigns consecutive addresses based on the address specified using the operation input device 104 to the air-conditioning devices that are connected to a lower-level network as vacant addresses (step S32).

By assigning upper-level addresses to air-conditioning devices of lower-level air-conditioning systems in this way, it is possible to perform the work of setting upper-level addresses for air-conditioning devices of lower-level air-conditioning systems without having to add a function for assigning upper-level addresses to air-conditioning devices of lower-level air-conditioning systems to the upper-level air-conditioning system.

When the repeater 100 (address converter 55) receives a control command having the upper-level addresses that are assigned to the air-conditioning devices of lower-level air-conditioning systems as destinations, the repeater 100 (address converter 55) performs protocol conversion of the control command, and from the address conversion table (FIG. 7: AT00), converts the destinations of the control command to lower-level addresses. By doing so, the upper-level air-conditioning system is able to communicate with the air-conditioning devices of the lower-level air-conditioning system.

(Effect)

As is explained in detail above, with this embodiment, multiple lower-level air-conditioning systems are connected to an existing upper-level air-conditioning system using a repeater 100. Furthermore, upper-level addresses are assigned to air-conditioning devices of lower-level air-conditioning systems. By doing so, it is possible for the upper-level air-conditioning system to communicate with air-conditioning devices of the lower-level air-conditioning systems using the assigned addresses. As a result, it is possible to perform individual control of air-conditioning devices of lower-level air-conditioning systems from an upper-level air-conditioning system without having to change the specifications of the upper-level air-conditioning system and lower-level air-conditioning systems.

In other words, with this embodiment, it is possible to assign upper-level addresses of an upper-level network to air-conditioning devices that are connected to a lower-level network, so it is possible to perform individual control of air-conditioning devices that are connected to an existing lower-level network from a central control device that is connected to an existing upper-level network without having to change the specifications of the upper-level network or lower-level network.

Moreover, the repeater 100 assigns addresses of a first air-conditioning system 600A to air-conditioning devices of a second air-conditioning system of the same system so that the addresses are consecutive. As a result, it is possible to correlate the addresses of the first air-conditioning system that are assigned with the system. Therefore, the operator is able to easily manage the air-conditioning devices.

Not only in the case of connecting lower-level air-conditioning systems to an existing upper-level air-conditioning system in order to expand the air-conditioning system, but even when additionally connecting air-conditioning devices to the lower-level air-conditioning systems after expansion, it is only necessary to perform an address setting process for assigning upper-level addresses to the air-conditioning devices of the lower-level air-conditioning systems. In doing so, it is possible to assign upper-level addresses to the added air-conditioning devices as well without overlapping of addresses.

Moreover, existing lower-level air-conditioning systems that use different communication methods than the upper-level air-conditioning system are connected to the upper-level air-conditioning system through the repeater 100. As a result, it is not necessary to perform wiring work in order to connect all of the air-conditioning devices of the lower-level air-conditioning systems to the upper-level air-condition. Therefore, it is possible to perform the work of expanding an air-conditioning system in a short period of time and at low cost.

In this embodiment, the first communication method, second communication method and third communication method are different, however, they can also be the same.

When connecting air-conditioning systems of different systems to the same air-conditioning system, it is possible to expand the air-conditioning system without reconfiguring the addresses of the air-conditioning devices of the air-conditioning systems to be connected, and the air-conditioning system can be expanded without being much trouble for the operator.

Furthermore, by adding one or more communicators to the repeater 130 that are different than the second communicator and third communicator, and by comprising an address assignment function and a protocol conversion function according to the communication method of the additional communicators, it is possible to additionally connect air-conditioning systems that communicate by communication methods that differ from the first communication method, second communication method and third communication method. As a result, it is possible to perform expansion of an air-conditioning system by connecting air-conditioning systems to the first air-conditioning system that communicate using various communication methods.

Second Embodiment

Next, a second embodiment of this disclosure will be explained.

In the first embodiment described above, in an address setting process for assigning upper-level addresses to air-conditioning devices of lower-level air-conditioning systems, when it is determined that there is overlapping of addresses, the upper-level addresses that are assigned to the air-conditioning devices of the lower-level air-conditioning systems are changed. However, in this embodiment, the addresses of the air-conditioning devices of the first air-conditioning system that are overlapped are changed.

(Construction)

The construction of the networked air-conditioning system 900 of this embodiment is the same as the construction of the networked air-conditioning system 900 of the first embodiment.

(Operation)

In the construction in FIG. 1, in the operation of setting upper-level addresses to be assigned to the air-conditioning devices of lower-level air-conditioning systems, an example of when the setting value of the operating input device 104 is 02 h is explained using FIG. 8, FIG. 9, FIG. 10 and FIG. 11. In this embodiment, the upper-level addresses that are assigned to air-conditioning devices of lower-level air-conditioning systems are assigned such that the upper-level addresses are all consecutive numbers.

Figure 8:
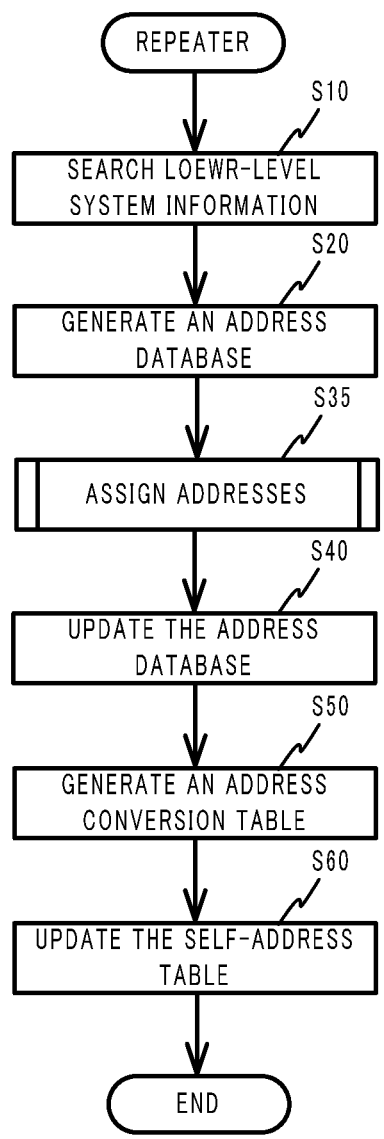
FIG. 8 is a flowchart of processing by a repeater of a networked air-conditioning system of a second embodiment of this disclosure when setting addresses.

FIG. 8 illustrates processing by the repeater 100 when performing the setting above.

Steps S10, S20, S40, S50 and S60 are the same as in the first embodiment above.

Figure 9:
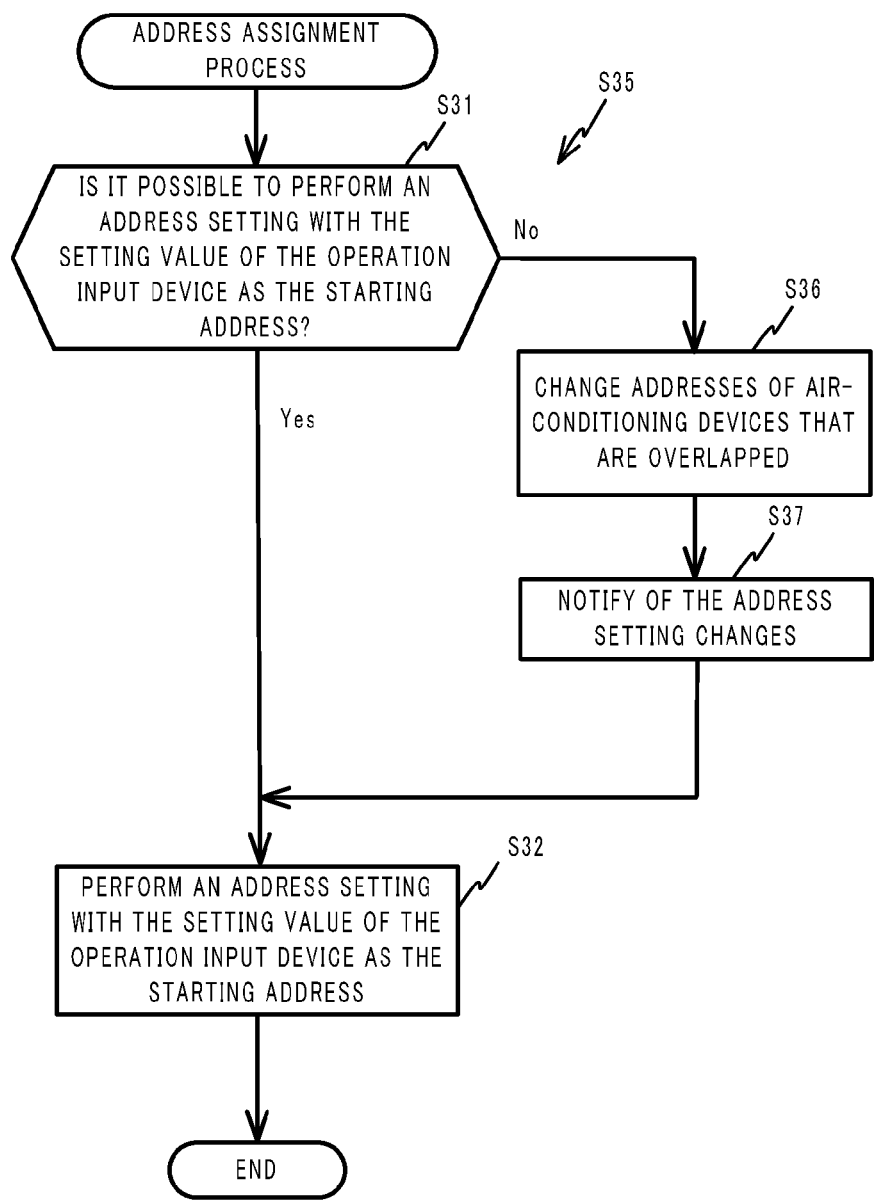
FIG. 9 is a flowchart of address assignment processing by a repeater of a networked air-conditioning system of a second embodiment of this disclosure when setting addresses.

The address assignment process of step S35 will be explained with reference to FIG. 9. Steps S31 and S32 are the same as in the first embodiment.

The repeater 100 (address assigner 52) determines whether or not it is possible to assign upper-level addresses to the air-conditioning devices of the lower-level air-conditioning systems so as to be consecutive numbers with all the setting values set from the operation input device 104 as the starting address (step S31). When it is determined to not to be possible (step S31: No), the repeater 100 (address assigner 52) searches for the address database (AD00), communicates with the indoor device 120 having a over-lapped address, and as illustrated in FIG. 10, for example, changes the addresses of the air-conditioning devices that are connected to the upper-level air-conditioning system so as not to overlap with the addresses that are assigned to the air-conditioning devices that are connected to the lower-level air-conditioning systems (step S36). In this embodiment, addresses are searched from the minimum value. However, addresses can also be searched from the maximum value or from an arbitrary value. By changing the addresses of the air-conditioning devices of the upper-level air-conditioning system when there are overlapped addresses in this way, it is possible for the operator to assign upper-level addresses to the air-conditioning devices of the lower-level air-conditioning systems.

Next, the repeater 100 (notifier 56) uses the address setting change notifier 109 to perform notification that the addresses of the air-conditioning devices of the upper-level air-conditioning system that are overlapped are changed (step S37). In this case, the repeater 100 (notifier 56), through the address setting change notifier 109, notifies the operator of information such as the upper-level address before and after the change. As a result, the operator is able to know the addresses of the air-conditioning devices of the upper-level air-conditioning system that were changed.

Moreover, when the addresses of the air-conditioning devices of the upper-level air-conditioning system are changed, the operator is notified that the upper-level address of the air-conditioning devices of the upper-level air-conditioning system were changed. Here, the operator is notified of the upper-level addresses of the air-conditioning devices before and after the change.

Presuming that it is determined to be possible to set addresses without address overlapping occurring (step S31: Yes), or after executing step S37, the repeater 100 (address assigner 52) assigns upper-level addresses with the setting value set using the operation input device 104 as the starting address (step S32). After that, in step S50 in FIG. 8, an address conversion table such as illustrated in FIG. 11, is generated.

As is explained in more detail above, with this embodiment, upper-level addresses are assigned to the air-conditioning devices of lower-level air-conditioning systems. In doing so, it is possible to perform the work of setting upper-level addresses to the air-conditioning devices of lower-level air-conditioning systems without having to add functions to the upper-level air-conditioning system such as assigning upper-level address to air-conditioning devices of lower-level air-conditioning systems.

Moreover, in this embodiment, when there is overlaps of the upper-level addresses of air-conditioning devices of an upper-level air-conditioning system and air-conditioning devices of lower-level air-conditioning systems, the addresses of the air-conditioning devices of the upper-level air-conditioning system are changed. As a result, it is possible to make the upper-level addresses given to the air-conditioning devices of the lower-level air-conditioning systems comply with the intentions of the operator.

Third Embodiment

Next, a third embodiment of this disclosure will be explained.

In the first and second embodiments described above, the repeater 100 sets the upper-level addresses that are assigned to the air-conditioning devices of the lower-level air-conditioning systems. However, it is also possible for the central control device 1 of the first air-conditioning system 600A to assign the upper-level addresses above to the air-conditioning devices of the lower-level air-conditioning systems. In that case as well, as in the case of the networked air-conditioning system 900 of the first embodiment and the second embodiment, it is possible to perform individual control of the air-conditioning devices of the lower-level air-conditioning systems from the upper-level air-conditioning system without having to change the specifications of the upper-level air-conditioning system and lower-level air-conditioning systems.

In this embodiment, the construction of networked air-conditioning system 900 is explained with reference to FIG. 12, however, this disclosure is not limited by this.

(Overall Construction)

As illustrated in FIG. 12, the networked air-conditioning system 900 comprises a first air-conditioning system 600A, second air-conditioning systems 600B, 601B, and a third air-conditioning system 600C. The first air-conditioning system 600A comprises a central control device 1, an outdoor device 110, and an indoor device 120. The first air-conditioning system 600 A performs communication using a first communication method. The second air-conditioning system 600B comprises an indoor device 200. The second air-conditioning system 601B comprises an outdoor device 210 and an indoor device 220. The second air-conditioning systems 600B, 601B perform communication using a second communication method. The third air-conditioning system 600C comprises an indoor device 230. In the third air-conditioning system, communication is performed using a third communication method. A repeater 130 connects the first air-conditioning system 600A, the second air-conditioning systems 600B, 601B and the third air-conditioning system 600C.

The central control device 1, the repeater 130, the outdoor device 110 and the indoor device 120 are connected by a first bus 400. The indoor device 200 is connected to the repeater 130 by a second bus 500. The outdoor device 210 and the indoor device 220 are connected to the repeater 130 by a second bus 510. The indoor device 230 is connected to the repeater 130 by a third bus 520.

The outdoor device 110, the indoor device 120, the outdoor device 210, the indoor device 220, the indoor device 230, the first bus 400, the second bust 500, the second bus 510 and the third bus 520 are the same as in the first embodiment.

(Construction: Central Control Device of the First Air-Conditioning System)

The central control device 1 comprises a first communicator 12, an address database memory 108 and a controller 11b.

The first communicator 12 is the same as in the first embodiment described above.

The address database memory 108 is the same as the address database memory 108 in the first embodiment.

The controller 11b comprises a computing device such as a CPU or the like, a RAM as a work area, and a ROM (Read Only Memory) as a storage device. The function of the controller 11b is achieved by the computing device executing a program that is stored in the ROM. As a result, the controller 11b creates and interprets control commands, performs control of the air-conditioning devices through the first communicator 12, and monitors the operating state. Moreover, the controller 11b searches and updates the address database.

The first communicator 12, the address database memory 108 and the controller 11b can be achieved by using separate devices, or part or all of the devices can be made to be common. Moreover, the central control device 1 has a unique upper-level address.

(Construction: Repeater)

The repeater 130 comprises a first communicator 102, an address conversion table memory 103, an operation input device 104, a second communicator 105, a second communicator 106, a third communicator 107 and a controller 101b.

In other words, the repeater 130 of this embodiment comprising a first communicator 102, an address conversion table memory 103, an operation input device 104, a second communicator 105, a second communicator 106, and a third communicator 107 is the same as the repeater 100 in the first embodiment.

The controller 101b comprises a computing device such as a CPU or the like, a RAM as a work area, and a ROM(Read Only Memory) as a storage device and the like. The function of the controller 101b is achieved by the computing device executing a program that is stored in the ROM. The controller 101b, based on information acquired from the operation input device 104, information about communication with the connected lower-level air-conditioning systems, and information about communication with the upper-level air-conditioning system, sets addresses for the lower-level air-conditioning systems that are connected to the repeater 100, updates the address conversion table 103 and the like. Furthermore, the controller 101b also converts the control command protocol for the upper-level air-conditioning system and lower-level air-conditioning systems.

The first communicator 102, the address conversion table memory 103, the operation input device 104, the second communicator 105, the second communicator 106, the third communicator 107 and the controller 101b can be achieved by using separate devices, or part or all of the devices can be made to be common.

In this embodiment, the repeater 130 comprises a first communicator 102, a second communicator 105, a second communicator 106, and a third communicator 107. However, the repeater 130 should comprise one of a second communicator and a third communicator.

Moreover, in this embodiment, the repeater 130 is constructed so as to be independent of the outdoor devices and indoor devices, however, can also be provided inside an air-conditioning device.

Figure 13:
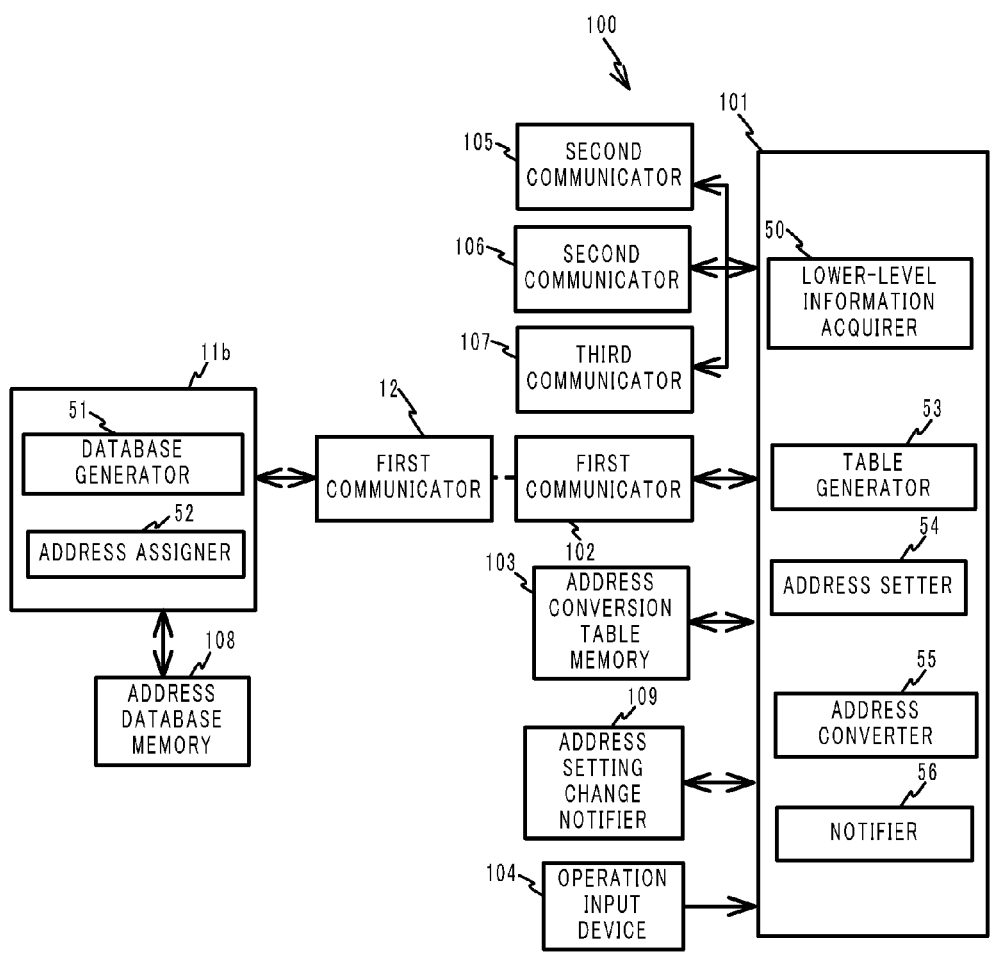
FIG. 13 is a block diagram illustrating the construction of a controller of a repeater of a networked air-conditioning system of a third embodiment of this disclosure.

FIG. 13 illustrates the functional construction centered on the controller 101b of the repeater 130, and the controller 11b of the central control device 1. As illustrated in FIG. 13, in this embodiment, a lower-level information acquirer 50, a table generator 53, an address setter 54, an address converter 55, and a notifier 56 are provided in the controller 101b. Moreover, a database generator 51 and an address assigner 52 are provided in the controller 11b that is connected to the upper-level network.

(Operation)

The address setting process for assigning upper-level addresses to the air-conditioning devices of the lower-level air-conditioning systems in the networked air-conditioning system 900 will be explained with reference to FIG. 14 and FIG. 15. In this embodiment, the upper-level addresses that are assigned to the air-conditioning devices of the lower-level air-conditioning systems are all consecutive.

Figure 14:
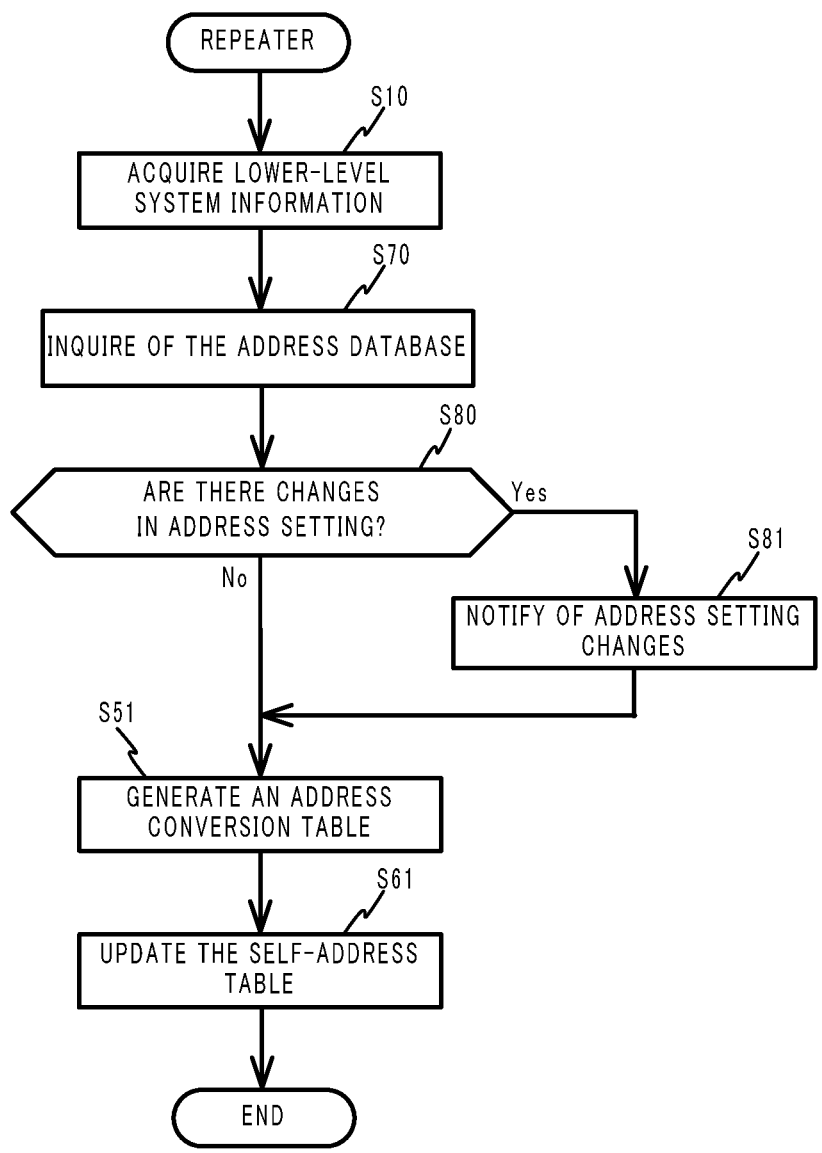
FIG. 14 is a flowchart of processing by a repeater of a networked air-conditioning system of a third embodiment of this disclosure when setting addresses.
Figure 15:
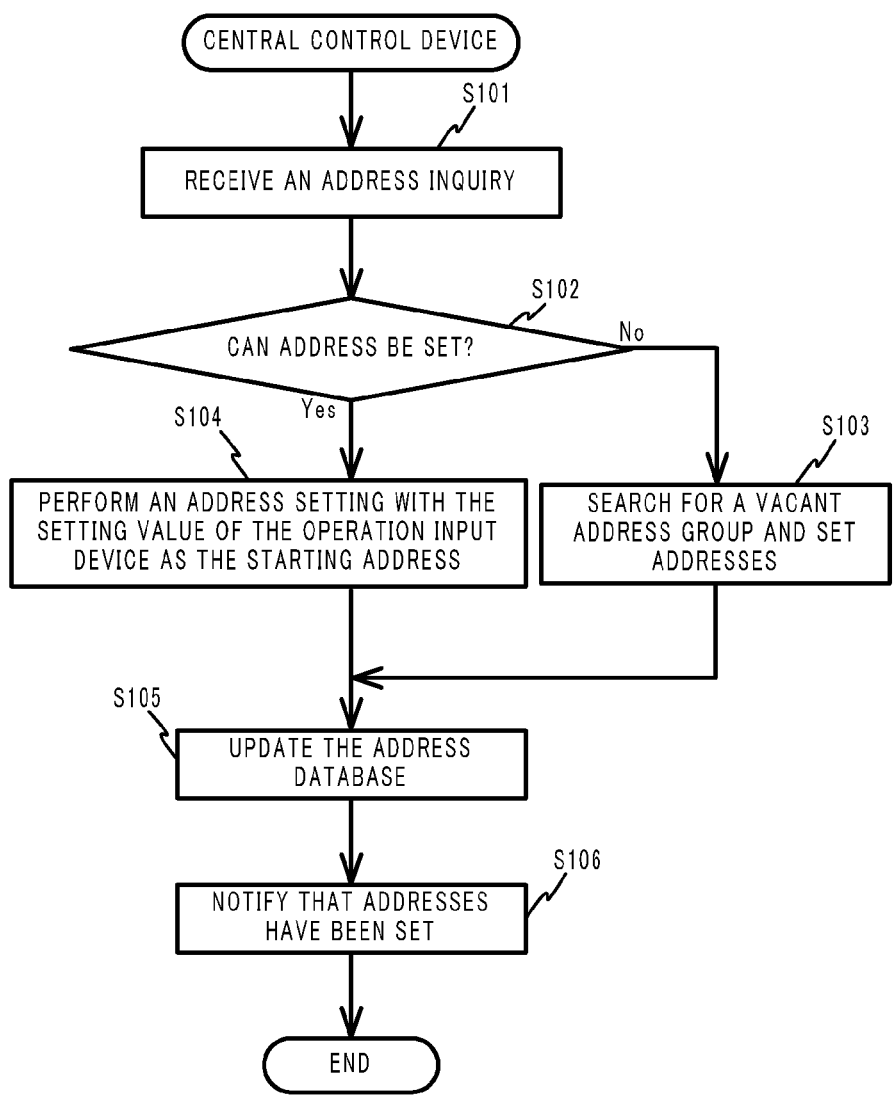
FIG. 15 is a flowchart of address assignment processing of a central control device by a repeater of a networked air-conditioning system of a third embodiment of this disclosure when setting addresses.

FIG. 14 illustrates the processing by the repeater 130 when performing the setting above.

Step S10 is the same as in the first embodiment.

After executing step S10, the repeater 130 sets the setting value of the operation input device 104 as a self address, and updates the self-address table 102a, then with this address as the transmission source, transmits an address database inquiry to the central control device 1 and receives an address setting notification from the central control device 1 (step S70). More specifically, the repeater 130 inquires whether the upper-level addresses that are to be assigned to the air-conditioning devices of the lower-level air-conditioning systems can be assigned so as to be all consecutive with the setting value of the operation input device 104 as the starting address. The central control device 1 sets the upper-level addresses to be assigned to the air-conditioning devices of the lower-level air-conditioning systems that are connected to the repeater 130, and returns information about the set upper-level addresses to the repeater 130 as an address setting notification. The address assignment process by the central control device 1 will be described later.

The repeater 130 that received an address setting notification from the central control device 1 determines based on the received address setting notification whether or not there is a change in address settings (step S80). When there is a change in the address settings (step S80: Yes), the repeater 130 (notifier 56) performs an address setting change notification through an address setting change notifier 109 (step S81).

More specifically, in the address setting notification, the repeater 130 notifies the operator through the address setting change notifier 109 that the upper-level addresses that are to be assigned to the air-conditioning devices of the lower-level air-conditioning systems have been changed from the address group specified by the operator. When doing this, notification is also given of the upper-level addresses before and after the change, the system and the like of the air-conditioning devices that the assignments of the upper-level address have been changed for.

After executing step S80 or step S81, the repeater 130 (table generator 53), based on the information acquired in step S10 and the address setting notification received from the central control device 1 in step S70, generates an address conversion table, and stores the table in the address conversion table memory 103 (step S51).

Next, based on the address setting notification received from the central control device 1 in step S70, the repeater 130 (address setter 54) sets the self address, and updates the self-address table 102a of the first communicator 102 (step S61). After executing step S61, the repeater 130 (controller 101b) ends processing.

The address setting process by the central control device 1 will be explained next with reference to FIG. 15.

First, the central control device 1 receives the address inquiry transmitted from the repeater 130 (step S101).

Next, the central control device 1 determines whether or not upper-level addresses can be set so that the upper-level addresses that will be assigned to the air-conditioning devices of the lower-level air-conditioning systems are unused and will be all consecutive numbers with the setting value of the operation input device 104 as a starting address without overlapping of addresses with other air-conditioning devices (step S102).

When it is determined that it is not possible to assign upper-level addresses so that the upper-level addresses that will be assigned to the air-conditioning devices of the lower-level air-conditioning systems are all consecutive numbers with the setting value of the operation input device 104 being the starting address (step S102: No), the central control device 1 (address assigner 52) searches the address database, and searches for a vacant address group of addresses that are unused and continuous for the number of air-conditioning devices of the lower-level air-conditioning systems, and sets the consecutive vacant address group found from the search as the upper-level addresses to be assigned to the air-conditioning devices of the lower-level air-conditioning systems (step S103). The address search can be performed from the minimum value, or can also be performed from the maximum value or an arbitrary value. The upper-level addresses that will be assigned to the air-conditioning devices of the lower-level air-conditioning systems are changed in this way when there is overlapping of addresses. By doing so, it is possible to assign upper-level addresses to air-conditioning devices of lower-level air-conditioning systems without having to change existing addresses of air-conditioning devices of the upper-level air-conditioning system.

Presuming that it is determined that it is possible to assign upper-level addresses so that the upper-level addresses to be assigned to the air-conditioning devices of the lower-level air-conditioning systems are all consecutive with the setting value of the operation input device 104 as the starting address (step S102: Yes), the central control device 1 (address assigner 52) sets the upper-level addresses so that the upper-level addresses to be assigned to the air-conditioning devices of the lower-level air-conditioning systems are all consecutive with the setting value of the operation input device 104 as the starting address (step S104: Yes).

Next, the central control device 1 (address assigner 52) updates the address database based on the addresses set in step S103 or step S104 (step S105).

Continuing, the central control device 1 (address assigner 52) transmits an address setting notification to the repeater 130 (step S106). Here, a notification of address database information that includes upper-level address information for addresses that are set to be assigned to air-conditioning devices of lower-level air-conditioning systems that are connected to the repeater 130 is sent to the repeater 130. When a change in addresses of air-conditioning devices of the upper-level system is performed, a notification is sent to the repeater 130 indicating that there was a change in addresses, and the addresses before and after the change.

As is explained in detail above, with this embodiment, the central control device 1 performs the assignment of upper-level addresses to air-conditioning devices of lower-level air-conditioning systems. As a result, it is possible to reduce the processing load on the repeater 130.

Fourth Embodiment

Next, a fourth embodiment of the disclosure will be explained.

In the third embodiment described above, when the central control device 1 determined that there is address overlapping in the address setting operation for assigning upper-level addresses to the air-conditioning devices of lower-level air-conditioning systems, the central control device 1 changed the upper-level address to be assigned to the air-conditioning devices of the lower-level air-conditioning systems from an address group with the setting value of the operation input device 104 as the starting address. In this embodiment, addresses of the air-conditioning devices of the upper-level air-conditioning system with address overlapping are changed.
(Construction)

The construction of the networked air-conditioning system 900 of this embodiment is the same as that of the networked air-conditioning system 900 of the third embodiment.
(Operation)

Figure 16:
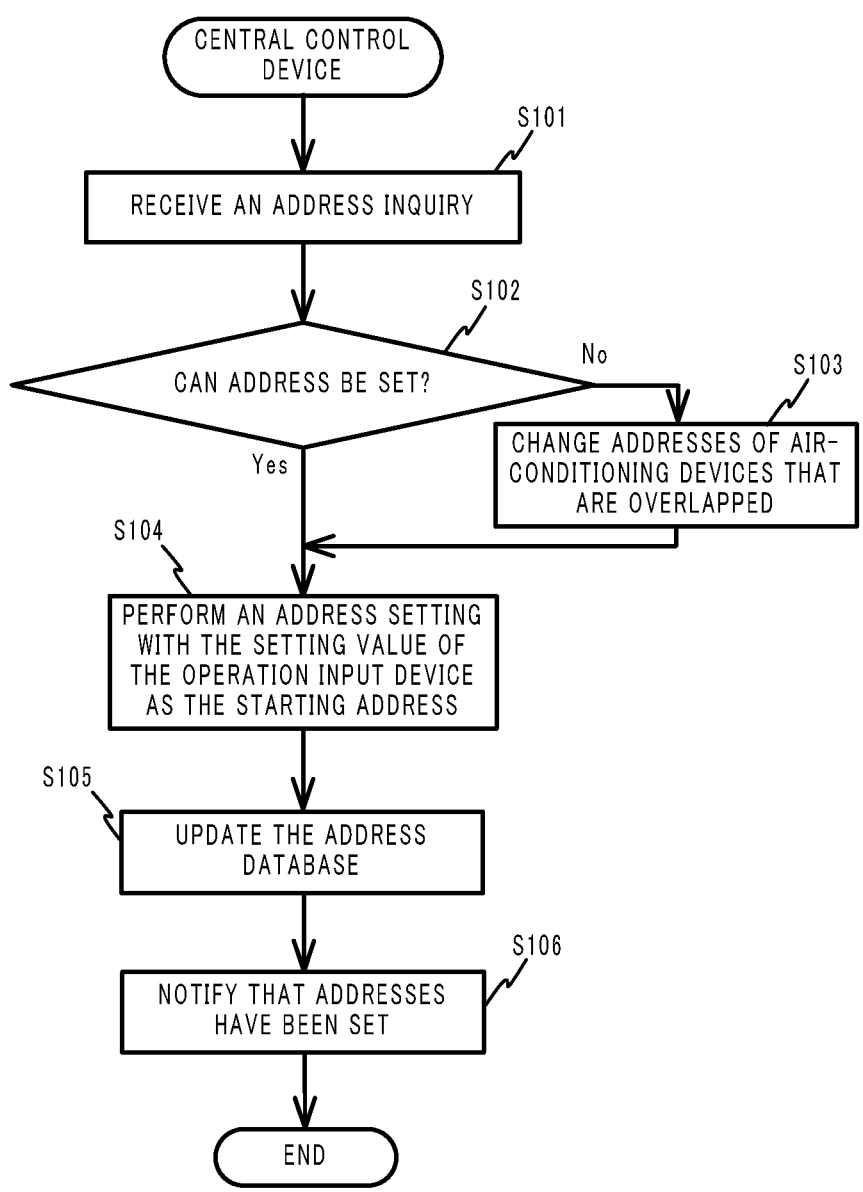
FIG. 16 is a flowchart of address assignment processing of a central control device by a repeater of a networked air-conditioning system of a fourth embodiment of this disclosure when setting addresses.

With the construction illustrated in FIG. 13, the operation for setting upper-level addresses to be assigned to air-conditioning devices of the lower-level air-conditioning systems will be explained with reference to FIG. 14 and FIG. 16. In this embodiment, the upper-level addresses are assigned so that the upper-level addresses to be assigned to the air-conditioning devices of the lower-level air-conditioning systems are all consecutive.

FIG. 14 illustrates processing by the repeater 130 when performing the setting above. In this embodiment, the processing by the repeater 130 is the same as the processing by the repeater 100 in the third embodiment.

The address assignment process by the central control device 1 will be explained with reference to FIG. 16.

Steps S101, S104, S105 and S106 are the same as in the third embodiment described above.

When it is determined that it is not possible to assign upper-level address so that the upper-level addresses to be assigned to the air-conditioning devices of the lower-level air-conditioning systems are all consecutive with the setting value of the operation input device 104 as the starting address (step S102: No), the central control device 1 (address assigner 52) searches for vacant addresses from the address database, communicates with the air-conditioning devices of the upper-level air-conditioning system with address overlapping, and changes the addresses of the air-conditioning devices of the upper-level air-conditioning system with address overlapping (step S103).

Moreover, when the addresses of the air-conditioning devices of the first air-conditioning system 600A with address overlapping are changed, the central control device 1 uses the address setting change notifier 109 to notify the operator that the addresses were changed and give information such as the addresses before and after change. As a result, the operator is able to know the upper-level addresses to be assigned to the air-conditioning devices of the lower-level air-conditioning systems, and the addresses of the air-conditioning devices of the first air-conditioning system that were changed.

As is explained in detail above, with this embodiment, when address overlapping occurs, it is possible for the operator to assign desired upper-level addresses to air-conditioning devices of lower-level air-conditioning systems by changing the addresses of the air-conditioning devices of the upper-level air-conditioning system.

In the embodiments above, the programs that are executed can be stored and distributed on a non-transitory computer-readable recording medium such as a flexible disk, a CD-ROM (Compact Disk Read-Only Memory), DVD (Digital Versatile Disk), MO (Magneto-Optical Disk) and the like, and by installing the programs a system that executes the processing described above can be constructed.

It is also possible to store the program on a disk drive of a specified server device on a communication network such as the Internet, and download the program by superimposing the program on a carrier wave.

Moreover, the functions described above can be achieved by the OS (Operating System) sharing, or by the OS and applications working together, and in that case, it is possible to store and distribute just the portion other than the OS on a medium, or download that portion.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The technology of this disclosure is suitable for performing individual control of air-conditioning devices of lower-level air-conditioning systems from an upper-level air-conditioning system when existing lower-level air-conditioning systems are connected to an existing upper-level air-conditioning system.

REFERENCE SIGNS LIST

1 Central control device
1A System
2A System
2B System
3A System
11 Controller
11b Controller
12 First communicator
50 Lower-level information acquirer
51 Database generator
52 Address assigner
53 Table generator
54 Address setter
55 Address converter
56 Notifier
100 Repeater
101 Controller
101b Controller
102 First communicator
102a Self-address table
102b First transmitter
102c First receiver
103 Address conversion table memory
104 Operation input device
105, 106 Second communicator
107 Third communicator
108 Address database memory
109 Address setting change notifier
110 Outdoor device
111 Controller
112 First communicator
120 Indoor device
121 Controller
122 First communicator
130 Repeater
200 Indoor device
201 Controller
202 Second communicator
210 Outdoor device
211 Controller
212 Second communicator
220 Indoor device
221 Controller
222 Second communicator
230 Indoor device
231 Controller
232 Third communicator
400 First bus
500, 510 Second bus
520 Third bus
600A First air-conditioning system
600B, 601B Second air-conditioning system
600C Third air-conditioning system
900 Networked air-conditioning system

The invention claimed is:

1. A networked air-conditioning system wherein a control device that is connected to a first network controls, through a repeater, air-conditioning devices that are connected to a second network which is different from the first network, the repeater relaying communication between the first network and the second network, comprising:

a second information acquirer configured to search the second network and acquire second network addresses of the air-conditioning devices that are connected to the second network;

a database generator configured to search the first network and generate a database of first network addresses of air-conditioning devices that are connected to the first network;

an address assigner configured to reference the database generated by the database generator and assign vacant addresses existing among the first network addresses of the first network to the air-conditioning devices that are connected to the second network; and a table generator configured to generate an address conversion table for converting the first network addresses to the second network addresses of the air-conditioning devices to which the first network addresses are assigned by the address assigner.

2. The networked air-conditioning system according to claim 1, wherein
the address assigner is configured to assign consecutive vacant addresses to the air-conditioning devices that are connected to the second network.

3. The networked air-conditioning system according to claim 2, wherein
the address assigner is configured to assign the consecutive addresses that are based on an address specified by a user as the vacant addresses to the air-conditioning devices that are connected to the second network.

4. The networked air-conditioning system according to claim 3, wherein
when the consecutive addresses that are based on the address specified by the user overlap with the addresses of the air-conditioning devices that are connected to the first network,
the address assigner is configured to assign other consecutive vacant addresses to the air-conditioning devices that are connected to the second network.

5. The networked air-conditioning system according to claim 4, further comprising:
a notifier configured to notify the user that the addresses of the air-conditioning devices that are connected to the first network are not the consecutive addresses based on the address that is specified by the user.

6. The networked air-conditioning system according to claim 3, wherein
when the consecutive addresses based on the address that is specified by the user overlap with the addresses of the air-conditioning devices that are connected to the first network,
the address assigner is configured to change the addresses of the air-conditioning devices that are connected to the first network so as not to overlap with the addresses to be assigned to air-conditioning devices that are connected to the second network.

7. The networked air-conditioning system according to claim 6, further comprising:
a notifier configured to notify the user that the addresses of the air-conditioning devices that are connected to the first network have been changed.

8. The networked air-conditioning system according to claim 1, wherein
the second information acquirer, the database generator, the address assigner and the table generator are provided in the repeater.

9. The networked air-conditioning system according to claim 1, wherein
the second information acquirer and the table generator are provided in the repeater; and
the database generator and address assigner are provided in the control device that is connected to the first network.

10. The networked air-conditioning system according to claim 1, wherein
the first network and the second network have communication methods which are different from each other,
the address assigner is further configured to search the database for the vacant addresses existing among the first network addresses of the first network to which the control device is connected which are consecutive vacant addresses, and
the address assigner is further configured so the second network addresses of the air-conditioning devices to which the first network addresses are assigned need not be consecutive addresses of the second network.

11. The networked air-conditioning system according to claim 1, further comprising:
an address converter, responsive to receipt, from the first network, of a control command having a destination which is one of the first network addresses assigned to the air-conditioning devices connected to the second network, that converts, based on the address conversion table, the destination of the control command from the first network address to the second network address, wherein the control command with the destination that is converted to the second network address is transmitted on the second network.

12. A repeater configured to relay communication between a first network and a second network which is different from the first network, comprising:
a second information acquirer configured to search the second network and acquire second network addresses of air-conditioning devices that are connected to the second network;
a database generator configured to search the first network and generate a database of first network addresses of air-conditioning devices that are connected to the first network;
an address assigner configured to reference the database generated by the database generator and assign vacant addresses existing among the first network addresses of the first network to air-conditioning devices that are connected to the second network; and
a table generator configured to generate an address conversion table for converting the first network addresses to the second network address of the air-conditioning devices to which the first network addresses are assigned by the address assigner.

13. A computer-readable non-transitory recording medium having stored therein a program allowing a computer to function as a repeater communication between a first network and a second network which is different from the first network, comprising:
a second information acquirer configured to search the second network and acquire second network addresses of air-conditioning devices that are connected to the second network;
a database generator configured to search the first network and generate a database of first network addresses of air-conditioning devices that are connected to the first network;
an address assigner configured to reference the database generated by the database generator and assign vacant addresses existing among the first network addresses of the first network to air-conditioning devices that are connected to the second network; and
a table generator configured to generate an address conversion table for converting the first network addresses to the second network addresses of the air-conditioning devices to which the first network addresses are assigned by the address assigner.

\* \* \* \* \*